(12) United States Patent
Leigh et al.

(10) Patent No.: US 10,924,185 B2
(45) Date of Patent: Feb. 16, 2021

(54) SYSTEMS AND METHODS OF DUAL-SIDE ARRAY BI-DIRECTIONAL CWDM MICRO-OPTICS

(71) Applicant: Hewlett Packard Enterprise Development LP, Houston, TX (US)

(72) Inventors: Kevin B. Leigh, Houston, TX (US); Michael Renne Ty Tan, Menlo Park, CA (US); Sagi Mathai, Sunnyvale, CA (US); Paul Rosenberg, Sunnyvale, CA (US); Wayne Sorin, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/056,378

(22) Filed: Aug. 6, 2018

(65) Prior Publication Data
US 2020/0044738 A1  Feb. 6, 2020

(51) Int. Cl.
| | |
|---|---|
| *H04B 10/25* | (2013.01) |
| *H04B 10/40* | (2013.01) |
| *H04J 14/02* | (2006.01) |
| *H04J 14/04* | (2006.01) |
| *H04J 14/06* | (2006.01) |

(Continued)

(52) U.S. Cl.
CPC ... *H04B 10/2589* (2020.05); *H04B 10/25891* (2020.05); *H04B 10/40* (2013.01); *H04J 14/02* (2013.01); *H04J 14/0216* (2013.01); *H04J 14/04* (2013.01); *H04J 14/06* (2013.01); *H04L 5/143* (2013.01); *H04Q 2011/0016* (2013.01); *H04Q 2011/0035* (2013.01)

(58) Field of Classification Search
None
See application file for complete search history.

(56) References Cited

U.S. PATENT DOCUMENTS

| | | | | |
|---|---|---|---|---|
| 3,953,727 A | * | 4/1976 | d'Auria | G02B 6/4215 398/88 |
| 6,563,976 B1 | * | 5/2003 | Grann | G02B 6/29311 385/24 |

(Continued)

OTHER PUBLICATIONS

"Tutorials of Fiber Optic Products"; 14 pages; printed on May 30, 2018; from: http://www.fiber-optic-tutorial.com/category/network-solutions/wdm-optical-network/cwdm-dwdm-mux-demux.

*Primary Examiner* — Li Liu
(74) *Attorney, Agent, or Firm* — Hewlett Packard Enterprise Patent Department

(57) ABSTRACT

Systems and methods are provided for a dual-side bi-directional optical multiplexing system includes a light receiving elements array receiving light from in an egress propagation direction from an optical fiber, arranged at a side of the optical fiber. The system also includes a light transmitting elements array emitting light in an ingress propagation direction into the optical fiber, and arranged at a second position to an opposing side of the optical fiber. The light receiving elements array and the light transmitting elements array are on dual-sides of the system with respect to the optical fiber. The system also includes bi-directional micro-optics interfacing with the optical fiber, and interfacing with the light transmitting elements array to direct light propagating in the ingress direction emitted from the light transmitting element array towards the optical fiber.

14 Claims, 7 Drawing Sheets

(51) Int. Cl.
  *H04L 5/14*    (2006.01)
  *H04Q 11/00*   (2006.01)

(56) References Cited

U.S. PATENT DOCUMENTS

| | | | |
|---|---|---|---|
| 7,006,727 B2 | 2/2006 | Morey et al. | |
| 7,860,398 B2* | 12/2010 | Tatum | G02B 6/4201 |
| | | | 398/139 |
| 8,705,975 B2 | 4/2014 | Chen et al. | |
| 9,703,042 B2 | 7/2017 | Mossberg et al. | |
| 9,864,145 B2 | 1/2018 | Dannenberg et al. | |
| 2004/0175181 A1* | 9/2004 | Grann | H04B 10/40 |
| | | | 398/139 |
| 2004/0234270 A1* | 11/2004 | Nishie | G02B 6/4246 |
| | | | 398/141 |
| 2005/0089268 A1* | 4/2005 | Chen | G02B 6/2938 |
| | | | 385/24 |
| 2006/0078252 A1* | 4/2006 | Panotopoulos | G02B 6/29367 |
| | | | 385/24 |
| 2006/0291858 A1* | 12/2006 | Lou | H01L 31/14 |
| | | | 398/58 |
| 2010/0278482 A1* | 11/2010 | Adachi | G02B 6/4204 |
| | | | 385/33 |
| 2012/0093514 A1 | 4/2012 | Park et al. | |
| 2012/0128295 A1* | 5/2012 | Lim | G02B 6/4246 |
| | | | 385/24 |
| 2015/0071638 A1* | 3/2015 | Heroux | H04B 10/2504 |
| | | | 398/79 |
| 2016/0195677 A1* | 7/2016 | Panotopoulos | G02B 6/4214 |
| | | | 250/227.23 |
| 2016/0246008 A1* | 8/2016 | Tan | G02B 6/29365 |
| 2016/0327746 A1* | 11/2016 | Mathai | G02B 6/29367 |
| 2017/0146755 A1* | 5/2017 | Kim | G02B 6/29362 |
| 2017/0242206 A1* | 8/2017 | Chen | G02F 1/09 |
| 2018/0212708 A1* | 7/2018 | Tian | H04J 14/06 |

\* cited by examiner

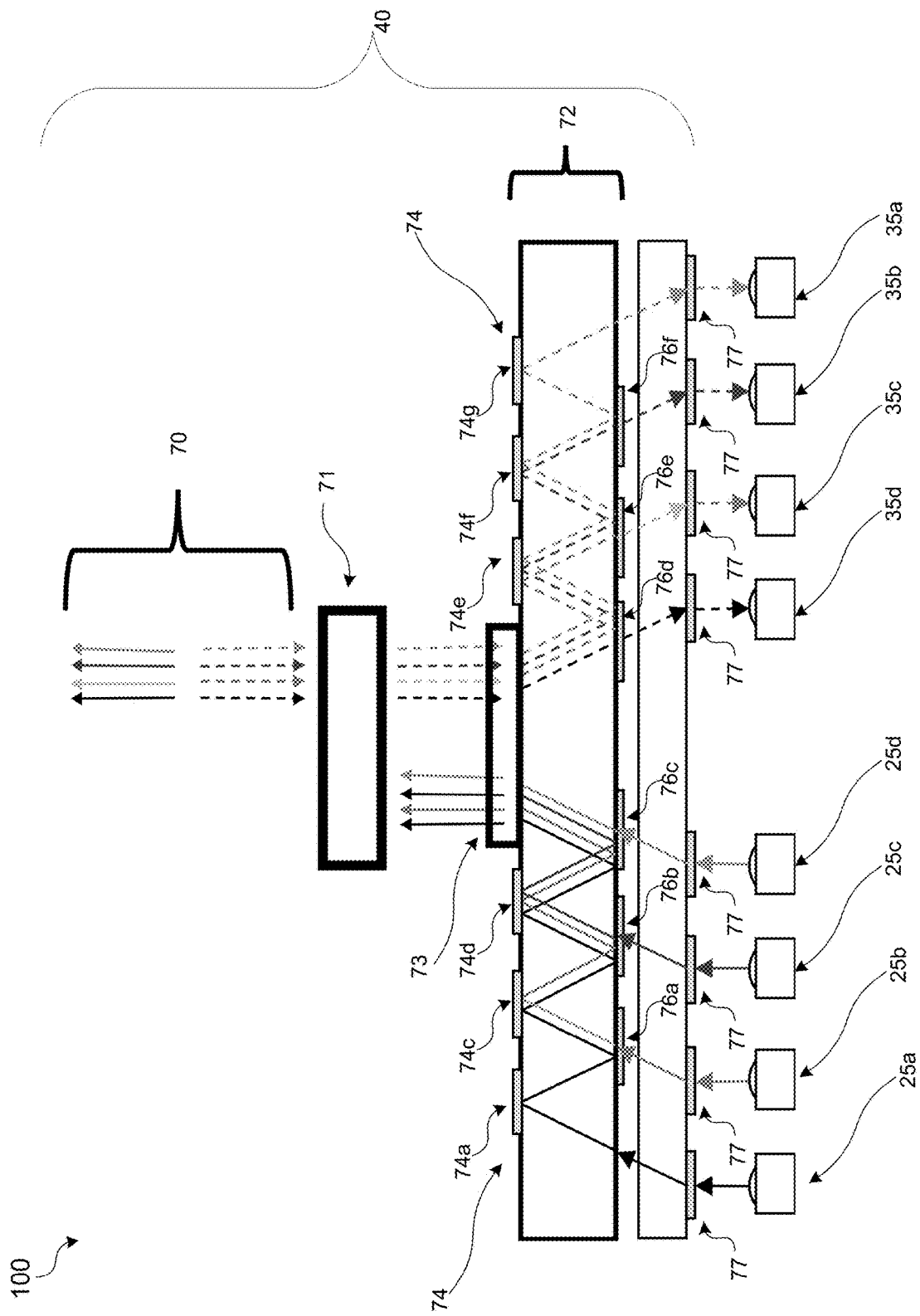

SYSTEMS AND METHODS OF DUAL-SIDE ARRAY BI-DIRECTIONAL CWDM MICRO-OPTICS

DESCRIPTION OF RELATED ART

Optical data systems or more generally, optical communication systems including, but not limited to, those used in large data centers, often must accommodate large amounts of data using a finite number of optical interconnects. In some optical communications systems, optical fibers are used to interconnect system elements. Increasing the amount of data handled by the optical communications system may lead to a demand for optical fiber interconnects that exceeds the available number of optical fibers in the existing optical communications system. In other instances, various factors such as, but not limited to, physical space and cost, may limit the number of available optical fibers in an optical communications system. In turn, the limited number of available optical fibers may lead to interconnection demand that exceeds the capacity that available optical fibers of the optical communication system can support. While more optical fibers can be added to accommodate the demand, adding optical fibers may be costly and in some cases impractical. Multiplexing may be a means for scaling interconnection capacity of an optical communication system without needing to add additional optical fibers. Among various multiplexing schemes, wave division multiplexing is often used in conjunction with optical communication systems.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a schematic of another example of an optical multiplexing system, including bi-directional micro-optics comprising a bi-directional multiplexer/de-multiplexer and a light directing element according to some embodiments.

Figure 1:
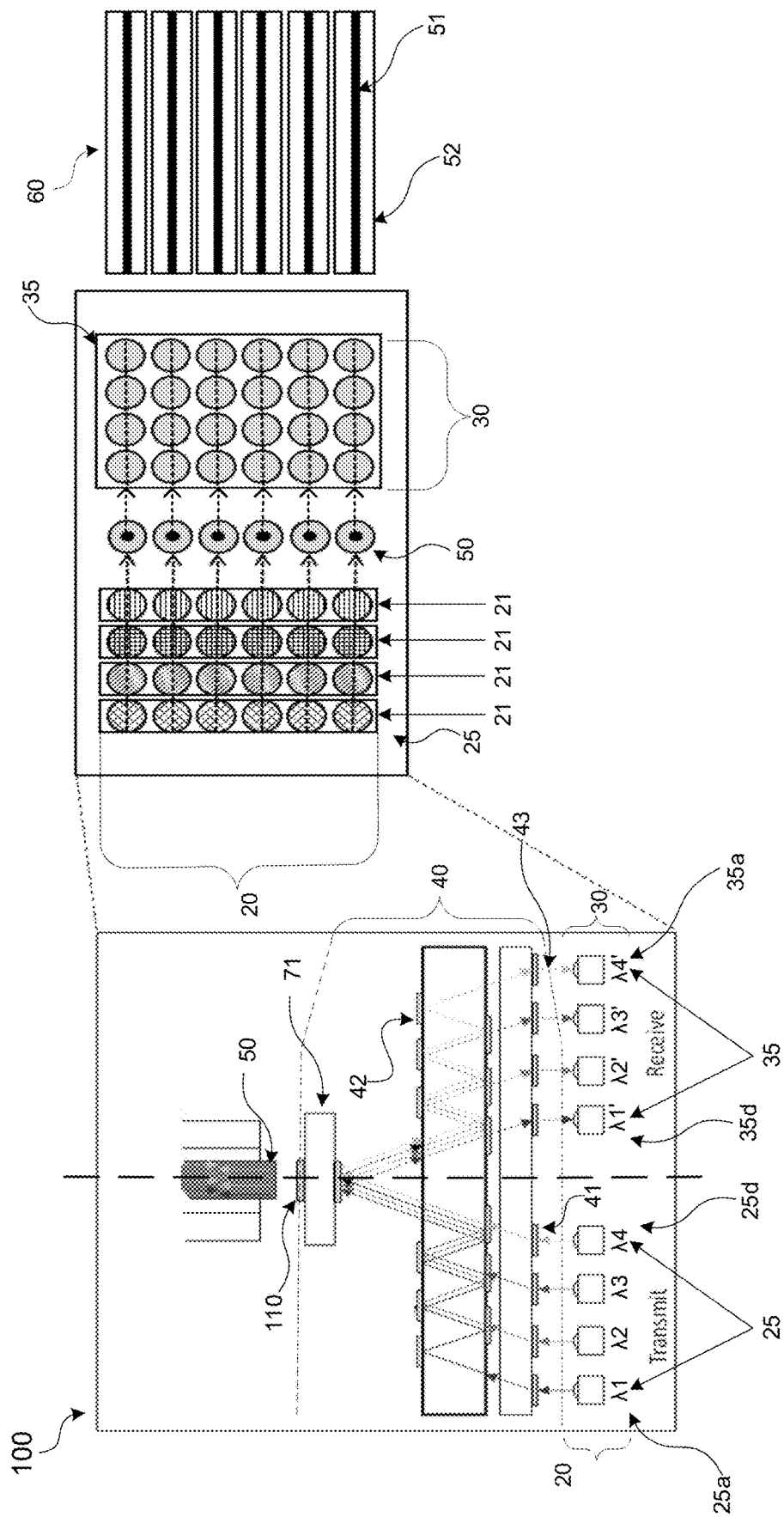
FIG. 1 is a schematic of an example optical multiplexing system, including a dual-side arrangement of light transmission and light receiving element arrays and bi-directional micro-optics according to some embodiments.

The figures are not exhaustive and do not limit the present disclosure to the precise form disclosed.

DETAILED DESCRIPTION

Various embodiments described herein are directed to an optical Coarse Wavelength Division Multiplexing (CWDM) multiplexer, including a dual-side arrangement of light transmitting and light receiving element arrays and bi-directional micro-optics. For purposes of discussion, the various systems and techniques of the disclosed embodiments may be hereinafter referred to as dual-side, bi-directional optical multiplexing. The dual-side, bi-directional optical multiplexing system utilizes a dual-side arrangement of two-dimensional (2D) arrays (e.g., orienting optical source arrays and photodetector arrays on either side of an optical fiber array) to achieve multiplexing of multiple wavelength sets on a single optical fiber. Additionally, the dual-side, bi-directional optical multiplexing system employs micro-optics arranged to interface with the optical fibers and the 2D arrays in manner that supports efficient bi-directional multiplexing.

Optical interconnection networks, as used in modern High-Performance Computing (HPC) fabrics for example, can involve complex optical fiber connectivity among network switches and computing systems. Some larger-scale optical fiber assemblies may require complex connectivity topologies, having a large number of optical fibers to support the infrastructure. In some system examples, optical transceiver components may be co-packaged with complex ASICs (application-specific integrated circuits) and there may be dozens of optical fibers coupling to each ASIC. Subsequently, there may be hundreds of optical fibers interconnecting among dozens of ASICs. Employing many optical fibers can consume a significant portion of the system connectivity costs, and increase the risk of potential misconnections of fibers among transmitter and receiver. To this end, reducing the number of optical fibers physically present in the topology can be a core design objective relating to optical interconnection networks.

Existing CWDM optical multiplexers can achieve some reduction in the number of optical fibers in a network, by employing bi-directional multiplexing to increase a density (e.g., number of wavelength signals capable of propagating through the fiber) associated with the optical fibers. In accordance with some conventional bi-directional multiplexers, a limited number of transmit (Tx) wavelengths and receive (Rx) wavelengths can be combined for transmission on a single optical fiber. As an example, current directly-modulated transceiver products that are configured to support bi-directional multiplexing, are typically, functionally restricted to carrying one wavelength signal per direction within the optical fiber. A directly-modulated transceiver may use a vertical cavity surface emitting laser (VCSEL) as a light transmitting element and a photodetector (PD) as a light receiving element. Each VCSEL may modulate a light (e.g., based on an electrical input) signal to produce a light signal with a carrier having a specific wavelength. Each VCSEL may also modulate an electrical signal to produce a light signal with a carrier having a specific spatial mode or polarization mode. Each photodetector may detect a light signal within a range of wavelengths and modes, where a mode may be spatial mode or polarization mode. The dual-side and bi-directional multiplexer, in accordance with the embodiments, multiplexes a larger number of optical signals with multiple wavelengths and/or modes within an optical fiber as compared to some existing CWDM optical multiplexers. Moreover, some current CWDM bi-directional technologies place all micro-optics on one side of the fiber light ingress/egress. A set of micro-optics may include wavelength filter, deflecting mirrors, focusing lenses, fiber attachment, alignment features.

A light signal ingress to a transmit fiber may be for the optical signals emitted by an array of VCSELs, and a separate light egress from a receive fiber may be for the optical signals received by an array of PDs. A sequence of deflecting mirrors and wavelength filters may be used to multiplex (or combine) the transmitted light signals by an array of VCSELs. Similarly, a sequence of deflecting mirrors and wavelength filters may be used to demultiplex (or separate) the received light signals by an array of PDs. In a one-sided configuration, optical signals with certain wavelengths from corresponding VCSELs that are farther away from the transmit fiber have to traverse a substantially longer propagation path to reach the transmit fiber in comparison to wavelengths from corresponding VCSELs that are closer to the transmit fiber. Similarly, in a one-sided configuration, optical signals with certain wavelengths from the receive fiber to corresponding PDs that are farther away have to traverse a substantially longer propagation path in comparison to wavelengths corresponding to PDs that are closer to the receive fiber. As a result of the increased propagation distance, signals transmitted at these wavelengths may experience high optical power loss.

For example, in an embodiment, a dual-side bi-directional optical multiplexer can combine four Tx signal wavelengths and four Rx signal wavelengths on a fiber. In continuing with the example, the bi-directional micro-optics allow the wavelengths to be combined, as various optical components (e.g., diffractive optical element, waveband filter, etc.) are arranged such that a row of each of the 2D arrays (e.g., four elements on each row) can receive or transmit optical signals (each having a corresponding wavelength) simultaneously on the same single fiber. Conversely, current CWDM-based systems may be limited in this capability, and support fewer wavelengths on one fiber Accordingly, the disclosed dual-side bi-directional optical multiplexing systems and techniques can achieve a solution that potentially reduces the optical fiber count approximately by half (e.g., 50%) over conventional CWDM multiplexing technologies, while providing the same amount of bandwidth. The dual-side bi-directional optical multiplexer also provides a simple and cost-efficient fiber routing, as a result of substantially decreasing the number of optical fibers. In some practical applications, the embodiments can yield a reduction in system connectivity costs that is directly proportional to the reduced optical fiber count (e.g., 50%), which is a significant portion of the total fabric cost.

FIG. 1 is a schematic of an example optical multiplexing system 100 including a dual-side arrangement of light transmitting and light receiving element arrays 20, 30 and bi-directional micro-optics 40. FIG. 1 illustrates a line of demarcation (added as a reference point for purposes of discussion, and should not be considered as a part of the system) along a central axis of an optical fiber 50 (with respect to length), that serves to delineate two principal sections of the system 100, referred to herein as dual-sides. In the example embodiment of FIG. 1, the optical fiber 50 may be oriented approximately in the center (with respect to a horizontal axis) of the system 100 an relative to the arrays 20, 30. It should be appreciated that the described arrangement is for the purposes of discussing the example optical multiplexing system 100, however other arrangements may be used. As an example, instead of optical fiber 50 being vertically aligned as shown in FIG. 1, there may be additional mirror element(s) to reflect the light to and/or from the bi-directional micro-optics 40 such that an optical fiber may be horizontal and may be positioned in a flexible position along the horizontal axis. Multiple light emitting optical sources 25 are situated on the left side of the optical fiber 50, and multiple light detecting photodetectors 35 are situated on the right side of the optical fiber 50. Accordingly, for purposes of discussion, the dual-sides of the system 100, which are located on either side of the line of demarcation, are described as a light emitting side (including the optical sources 25), and a light detecting side (including the photodetectors 35). Although the embodiments are discussed in the context of CWDM, it should be appreciated that the system 100 can be implemented in accordance with other optical signaling technologies, such as dense wavelength division multiplexing (WDM), as deemed appropriate. In addition, there may be other signaling superimposed to CWDM, such as polarization mode multiplexing and spatial mode division multiplexing.

Generally speaking, the bi-directional micro-optics 40 includes optical elements, such as mirrors and lenses, that are assembled in some arrangement that allows light to be manipulated so it propagates to reach the appropriate element based on the wavelength. For instance, the bi-directional micro-optics 40 are configured to interact with optical signals at the receive wavelength in a manner that causes the light to propagate towards the photodetectors, and subsequently received by the system 100. Further details regarding the structural arrangement and components of the bi-directional micro-optics 40 are discussed in reference to FIG. 2, for example.

In some embodiments, bi-directional micro-optics 40 may be configured to manipulate the propagation of light, such that light travels towards, or from, one of the dual-sides of system 100 to be directed by the optical elements. For instance, light from the light emitting side is directed by the bi-directional micro-optics 40 along a path (and towards a direction) that eventually interfaces with the optical fiber 50. Alternatively, the bi-directional micro-optics 40 can effectuate directing of a beam of light from the optical fiber 50 towards the light detecting side of the system 100. In contrast to the one-sided configuration used by some existing CWDM technologies, the dual-side configuration of system 100 positions the farthest optical source 25a and the farthest photodetector 35a relatively equidistant from the same optical fiber 50. Restated, the distance between the farthest optical source 25a and the optical fiber 50, as well as the farthest photodetector 35a and the optical fiber 50 is reduced in comparison to some existing one-sided CWDM systems. System 100 can be configured such that the TX devices (e.g., optical sources 25) and RX devices (e.g., photodetectors 35) are paired to equate the propagation length between the corresponding TX devices and RX devices. Thus, the dual-side aspects of the disclosed embodiments ensure that the propagation length to the optical fiber 50, for all optical signal wavelengths, is not greater than this reduced distance between the Tx devices to the optical fiber 50, and the reduced distance between the Rx devices to the optical fiber 50. As seen in FIG. 1, the arrangement of the dual-side bi-directional optical multiplexing system 100 achieves this, as the optical signal wavelength having the longest propagation path towards the optical fiber 50 is optical signal wavelength $\lambda 1$ (e.g., Tx), which corresponds to the farthest optical source 25*a*. The optical signal wavelength having the longest propagation path away from the optical fiber 50 is optical signal wavelength $\lambda 4'$ (e.g., Rx), which corresponds to farthest photodetector 35*a*. Due to the equidistance of optical source 25*a* and photodetector 35*a*, there is no difference in the length of the propagation paths for both the longest Rx optical signal wavelength $\lambda 1$, and the longest Tx optical signal wavelength $\lambda 4'$. That is, the propagation lengths corresponding to optical signal wavelength $\lambda 1$ and optical signal wavelength $\lambda 4'$, are approximately equal and reduced (e.g., relative to one-sided CWDM systems, alluded to above). Accordingly, the system 100 realizes a decrease in the otherwise large propagation distances that may be experienced by some other CWDM bi-directional technologies, and in turn, lowers optical power loss as compared to these technologies.

Moreover, it should be appreciated that optical signal wavelengths corresponding to two complementary optical elements (e.g., an optical source 25 and a photodetector 35 that are the same distance from the optical fiber 50 are considered complementary), can have equal propagation path lengths due to arrangement of the dual-side bi-directional multiplexing system 100. For example, the Tx optical signal wavelength having the shortest propagation path to the optical fiber 50 is optical signal wavelength $\lambda 4$, which corresponds to optical source 25*b*. The Rx optical signal wavelength having the shortest propagation path away from the optical fiber 50 is optical signal wavelength $\lambda 1'$, which corresponds to photodetector 35*b*. Optical source 25*b* and photodetector 35*b* are complementary, being positioned at the same distance (e.g., shortest distance) with respect to the optical fiber 50. Similarly, the optical signal wavelengths $\lambda 4$ (Tx) and $\lambda 1'$ (Rx) corresponding to these complimentary elements, also have propagation paths of equal length. Thus, the embodiments can realize an equalized propagation path for complementary optical signal wavelengths.

The dual-side bi-directional optical multiplexing system 100 can perform both multiplexing and demultiplexing of optical signals. For instance, the system 100 can combine, or multiplex, a plurality of optical signals on a single optical fiber, such as optical fiber 50, by assigning each optical signal of the plurality to a different wavelength of light. Alternatively, the system 100 can separate, or demultiplex, one or more received components of a light beam from optical fiber 50 to produce discrete (or individual) received components.

In an embodiment, the system 100 can combine four signal wavelengths for transmission signals (shown in FIG. 1 as Transmit), and four signal wavelengths for receiving signals (shown in FIG. 1 as Receive) within optical fiber 50 to carry data. By utilizing a plurality of different wavelengths the dual-side, bi-directional optical multiplexing system 100 can leverage the use of an inherently wide spectral range of many optical fibers. Moreover, the system 100 is designed to facilitate bi-directional, or two-way, communication (e.g., transmission and reception) of optical signals using the single optical fiber 50.

In an embodiment, the dual-side, bi-directional optical multiplexing system 100 can be configured to convey transmit (Tx) signals and receive signals (Rx) using different wavelength sets. As an example, the system 100 is configured to use wavelengths approximately between 850 nm to 1100 nm in the described wavelength sets. In this case, each wavelength set is correspondingly assigned to transmit signals or receive signals, respectively. FIG. 1 shows a set of transmit signal wavelengths including wavelengths $\lambda_1$-$\lambda_4$. The receive signal wavelength set includes wavelengths $\lambda_5$-$\lambda_8$. As an example of bi-directional operation, the dual-side, bi-directional optical multiplexing system 100 can utilize the four transmit signal wavelengths $\lambda_1$-$\lambda_4$ to carry a set of optical signals in a upstream direction (shown in FIG. 1 as up arrows) through the optical fiber 50. Simultaneously, the four receive signal wavelengths $\lambda_5$-$\lambda_8$ can carry a second set of optical signals in a downstream direction (shown in FIG. 1 as down arrows) from the optical fiber 50. Consequently, the dual-side, bi-directional optical multiplexing system 100 is configured to provide a four-lane port over optical fiber 50, which allows for the simultaneous communication of optical signals at eight different wavelengths of light. In contrast, some existing bi-directional CWDM technologies would require two separate optical fibers (e.g., four wavelength CWDM systems) to achieve a similar functionality as system 100 in using as single optical fiber 50.

FIG. 1 additionally shows a top view of the light transmitting and light receiving element arrays 20, 30 interfacing with optical fiber 50. The top view serves to illustrate that the arrays 20, 30, can be two-dimensional (2D) structures including elements that are oriented forming rows and columns that are substantially orthogonal (e.g., in an x-direction and a y-direction). In the illustrated example, the light transmission element array 20 includes a plurality of optical sources 25. The optical sources 25 are configured to emit light into the zigzag propagation path of the bi-directional micro-optics 40 at a particular wavelength that is assigned from the set of transmit signal wavelengths. In some embodiments, the optical sources 25 are lasers. In particular, the optical source 25 may be a VCSEL, in some examples. In other examples, the optical source 25 can be another optical source including, but not limited to, a light emitting diode (LED).

As shown in FIG. 1, the optical sources 25 can be arranged such that the light is emitted towards the bi-directional micro-optics 40 in a manner that directs the light from the light transmitting side of the system 100, and in the appropriate direction (e.g., right) towards the optical fiber 50. In the illustrated example, optical sources 25 are assembled as a 4×6 array by arranging four adjacent 1×6 arrays 21. Also, FIG. 1 illustrates that each vertical column of the array 20 includes optical sources 25 emitting light at the same wavelength, where the wavelength is indicated by a particular fill pattern. As an example, the diamond pattern can correspond to transmit signal wavelength $\lambda_1$. In the example embodiment of FIG. 1, the optical sources 25 are arranged as a 4×6 array 20 having six elements along the vertical plane, and four elements along the horizontal plane.

Similarly, photodetectors 35 are assembled as a 4×6 array to comprise the light transmitting element array 30. Photodetectors 35 can be a semiconductor photodetector, such as a P-I-N (PIN) diode photodetector, as an example. However, other light detection devices can be used in combination with (or instead of) diode photodetector. In some embodiments, a photodetector 35 can be integrated with a collimating lens to focus light (e.g., received light) and/or tilt light. The photodetectors 35 are configured to detect a portion of a light beam at a wavelength passed through the micro-optics 40. For example, a photodetector 35 may be particularly positioned to receive light wavelength $\lambda_8$ passed by a filter of the micro-optics 40. Additionally, FIG. 1 illustrates a fiber-optic cable 60 that may be used for CWDM communication, in accordance with the embodiments. The cable 60 can be made up of optical fiber core 51 surrounded by cladding 52 to carry the optical signals conveying information within an optical interconnection network, for example. In the illustrated example, the cable 60 can include six fibers (corresponding to each row of the arrays 20, 30).

Referring back to the wavelength sets employed by system 100, in another embodiment, the same wavelengths can be utilized for both the transmit signal wavelength set and the receive signal wavelength set by a system. However, different modes of the wavelength set may be needed for the transmit wavelength set and the receive wavelength set to traverse within the same fiber. Different modes may be different spatial modes or different polarization modes. For example, FIG. 1 illustrates that the Transmit wavelength set with a spatial mode can include $\lambda_1$-$\lambda_4$, while the Receive wavelength set with a different spatial mode includes $\lambda_1'$-$\lambda_4'$. According to this embodiment, the bi-directional optical signal transmission within a fiber is achieved by utilizing mode division multiplexing (MDM), where a mode is employed for communicating optical signals for transmission at the relevant wavelengths, and a separate mode is employed for optical signals for receive at the same wavelengths. For instance in MDM, the transmit elements can each transmit a different mode $m_n$. Thus, system 100 operating in a first mode, can enable the communication of optical signals using mode $m_1$ (e.g., associated with optical signal wavelength $\lambda_1$) for transmission purposes and a second mode $m_2$ can enable communicating optical signals (e.g., associated with optical signal wavelength $\lambda_1'$) for receiving. By implementing these modes, system 100 can transfer optical signals that coexist on the same optical fiber 50, even though the optical signals are assigned to the same wavelengths.

In an embodiment implementing MDM, a system 100 located at one end of an optical link may use a transmit (Tx) emitting mode1 light and a receive (Rx) accepting mode-2 light. At the other end of the optical link, another system 100 can use the converse, having a Rx accepting mode1 light and a Tx emitting mode2 light. This approach may require the optical sources 25 to produce light at different modes that can belong to Tx band or Rx band. Additionally, a system 100 can have the same Tx/Rx design so that a deployment does not have to use different component parts between two systems in order for Tx on one system and Rx on the other system to work together. It should be understood that in accordance with MDM, Tx ends of a communicating system pair need to use different modes. In the case of wave division multiplexing (WDM), which is discussed in more detail in reference to FIG. 3B, using different Tx modes (but the same wavelength set) between a communicating system pair can involve a method to configure the Tx ends a priori to actual data communication. This configuration may be best done automatically, which is beyond the scope of this disclosure. Additional details regarding the mode division multiplexing embodiment of the system 100 are discussed in reference to FIG. 7, for example.

Figure 3A:
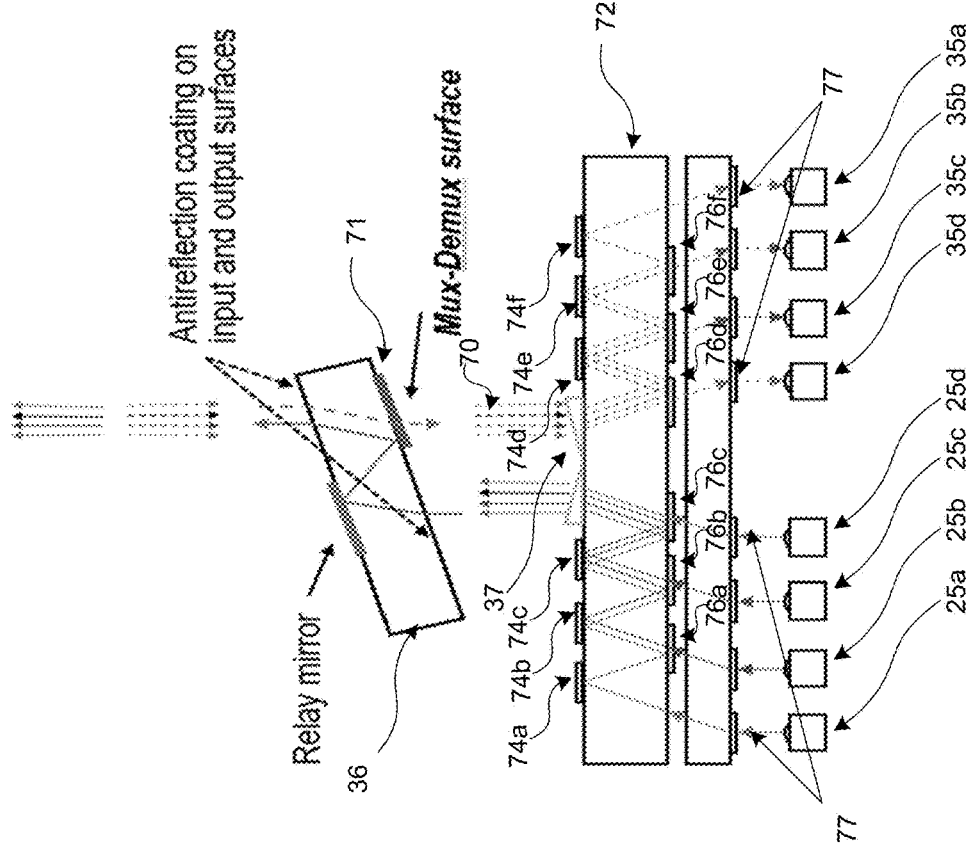
FIG. 3A illustrates another example of an optical multiplexing system including a multilayer dielectric filter implementation of a surface for the bi-directional multiplexer/de-multiplexer and a prism implementation of the light directing element according to some embodiments.
Figure 3B:
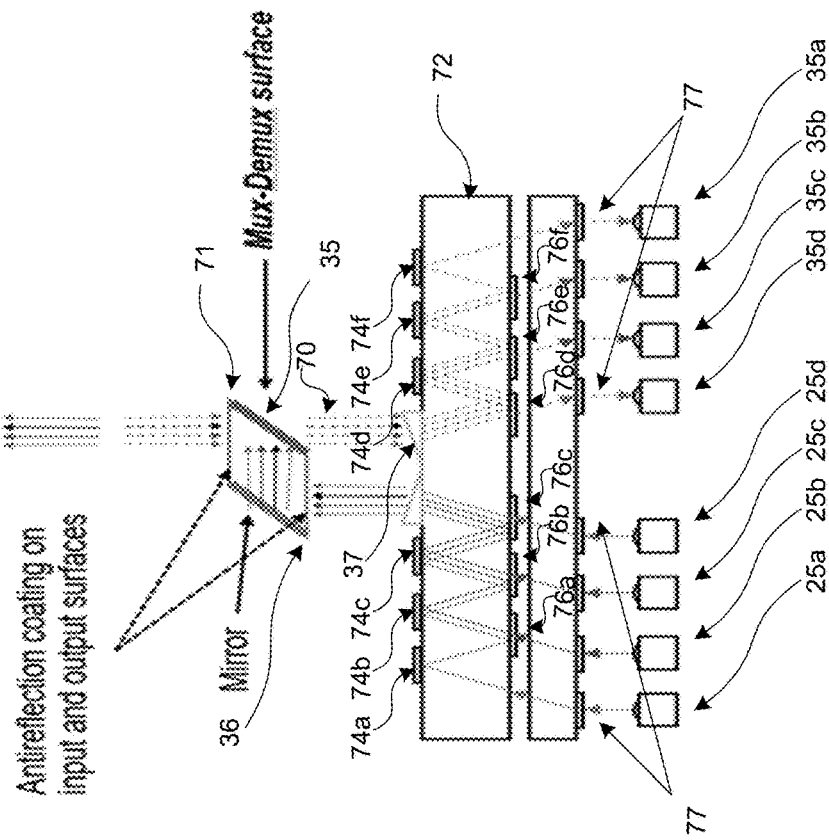
FIG. 3B illustrates another example of an optical multiplexing system including a diffractive grating implementation of a surface for the bi-directional multiplexer/de-multiplexer and a prism implementation of the light directing element according to some embodiments.

Referring back to FIG. 2, the system 100 includes a light directing element 73 situated on the zig-zag multiplexer/de-multiplexer 72. In varying embodiments, the light directing element 73 can be implemented as different elements capable of reflecting and/or diffracting light beams 70, such as a prism, mirror, diffraction grating, or lens. In some examples, as shown in FIG. 1 for instance, the bi-directional multiplexer/de-multiplexer 71 includes a the beam-forming lens 110 that both focuses and tilts the light beam in order to collimate the light propagating from the optical fiber 50 towards the light directing element. FIG. 3A and FIG. 3B particularly illustrate a prism 37 as an embodiment of a light directing element. In particular, the prism 37 can tilt light beams 70. For example, FIG. 3B shows a portion or component of the light beam 70 propagating towards the bi-directional multiplexer/de-multiplexer 71 (e.g., the received component) passes through the prism and is tilted to facilitate the zigzag propagation path of the light zig-zag multiplexer/de-multiplexer.

According to various examples, the bi-directional multiplexer/de-multiplexer 71 is configured to selectively separate or de-multiplex one or more received components of the collimated light beams 70 according to the wavelengths of the received light. Further, the bi-directional optical multiplexer/de-multiplexer 71 may selectively combine or multiplex one or more transmitted components into the light beams 70 exiting the bi-directional multiplexer/de-multiplexer 71 according to the wavelengths of the light to be transmitted. Each of the components of the collimated light beams 70, whether transmitted or received by the bi-directional multiplexer 71, may be distinguished according to a wavelength of light that represents the component. As such, the bi-directional multiplexer/de-multiplexer 71 may facilitate bi-directional wavelength division multiplexing (WDM) of the received and transmitted components, according to various examples. For example, the received component may include light of or having a predetermined wavelength that is propagating toward the bi-directional multiplexer/de-multiplexer 71. The transmitted component may include light that is propagating away from the bi-directional multiplexer/de-multiplexer 71, where the light or the transmitted component has a different predetermined wavelength from the received component. As such, received and transmitted components may represent wave division multiplexed optical signals with each optical signal being at a different wavelength in the collimated light beams 70, according to various examples. In other embodiments, the bi-directional multiplexer/de-multiplexer 71 can achieve multiplexing and de-multiplexing of optical signals in accordance with other varying methods in addition to waveband, including polarization and spatial modes. Polarization methods of the system 100 are described in greater detail in reference to FIG. 6. In some embodiments, polarization techniques require additional considerations, such as polarization maintaining fiber and/or polarization diversity receiver. According to various examples, types of polarization splitters can include, but are not limited to, wire grid polarizers, and high contrast grating polarizers. Spatial modes methods of the system 100 are described in greater detail in reference to FIG. 7. According to various examples, types of spatial mode splitters can include, but are not limited to, mirrors or apertures, and high contrast grating.

Furthermore, in FIG. 2, bi-directional micro-optics 40 include a plurality of relay mirrors 74a-74f. The relay mirrors 74a-74f can be configured to collimate and reflect light along the zigzag propagation path (shown in FIG. 2 as zigzag arrows inside of zig-multiplexer de-multiplexer 72) within the micro-optics 40. The zigzag propagation path successively filters or splits-off different wavelengths of the light, for instance directing a receive signal having wavelength $\lambda_4'$ (shown in FIG. 1) to the photodetector 35a configured for receiving wavelength $\lambda_4'$, which corresponds to the particularly received wavelength. As illustrated, the relay mirrors 74a-74f are configured to reflect internal light (with respect to the micro-optics 40) to follow the zigzag propagation path between relay mirrors 74a-74f and optical filters 76a-76f within the micro-optics 40. According to some examples, the relay mirrors 74a-74f may be "shaped" to focus and/or collimate the light. In some cases, the collimating the reflected light may help to reduce or compensate for a spreading of the internal light beam along the zigzag propagation path. In some embodiments, the relay mirrors 74a-74f can be high contrast grating (HCG) mirrors.

The dual-side bi-directional optical multiplexing system 100 is shown to further include a plurality of optical filters 76a-76f. According to the embodiments, the reflective optical filters 76a-76f are configured to selectively pass a different wavelength of light in the internal light beam. Furthermore, each of the reflective optical filters 76a-76f are configured to reflect optical wavelengths that are not passed by the respective, reflective optical filter 76a-76f. For example, an optical filter 76c may be particularly configured to pass light emitted from an optical source 25d at a wavelength $\lambda_4$ (shown in FIG. 1) while reflecting signals at other wavelengths such as $\lambda_1$, to be further propagated towards the optical fiber 50, essentially multiplexing wavelengths $\lambda_1$, $\lambda_2$, $\lambda_3$. Similarly, a second optical filter 76b may be particularly configured to pass light emitted from an optical source 25c at a wavelength $\lambda_3$ while reflecting $\lambda_1$ and $\lambda_2$ to be further propagated towards the optical fiber 50, essentially multiplexing wavelengths $\lambda_1$, and $\lambda_2$. Finally, a third optical filter 76a may be particularly configured to pass light emitted from an optical source 25b at a wavelength $\lambda_2$ while reflecting $\lambda_1$ to be further propagated towards the optical fiber 50, essentially multiplexing wavelength $\lambda$. Optical filters 76d-76f are arranged in the light receiving side (e.g., right of the center axis of the optical fiber 50) of the dual-sides of the system 100 can function in a similar manner, but rather passing selected wavelengths for further propagation towards photodetectors 35a-35d. In the shown embodiment, the relay mirrors 74a-74g and optical filters 76a-76f are mounted to the zig-zag multiplexer/de-multiplexer 72.

According to some examples, the dual-side bi-directional optical multiplexing system 100 can include light deflecting micro-optics 77. The light deflecting micro-optics 77 can be lenses configured to bend and focus light as an interface between the micro-optics 40 and the optical sources 25a-25d and/or photodetectors 35a-35d. In some examples, the deflecting micro-optics 77 is implemented as an prism. In some cases, the light deflecting micro-optics 77 can be mounted to a block, which can be a transparent substrate constructed from an optically transparent material such as, but not limited to, glass or another dielectric material, for example.

Referring now to FIG. 3A, an embodiment of the system 300 is illustrated including a specific implementation of the bi-directional multiplexer/de-multiplexer 71 for waveband splitting. In detail, a surface of the bi-directional multiplexer/de-multiplexer 71 is constructed as a multilayer dielectric filter 35. For example, the multilayer dielectric filter 35 is a wavelength-selective optical filter, which can deflect light propagating in the egress propagation direction from the optical fiber towards a zigzag propagation path based on the plurality of receive wavelengths. In various examples, the bi-directional multiplexer/de-multiplexer 71 has an antireflection coating on the input and output surfaces.

FIG. 3B shows an alternate implementation of the bi-directional multiplexer/de-multiplexer 71 for waveband splitting. In this example, the bi-directional multiplexer/demultiplexer 71 tilted so the light beams bounce in a zig zag manner. The surface of the directional multiplexer/demultiplexer 71 has a relay mirror 36 and mux-demux surface (not numbered in the drawing) disposed on opposite surfaces thereon. The mux-demux surface in some examples, selectively routes light towards the zig-zag multiplexer/de-multiplexer 72 in accordance to the wavelength associated with the signal. For instance, the mux-demux surface can be configured as a waveband filter to selectively pass portions of the beams 70 at a first wavelength, and to reflect portions of the beams 70 at other wavelengths. Additional details regarding aspects of waveband splitting using optical filters are disclosed herein, for example in reference to FIG. 4B.

Referring back to FIG. 2, the system 100 includes a light directing element 73 situated on the zig-zag multiplexer/de-multiplexer 72. In varying embodiments, the light directing element 73 can be implemented as different elements capable of reflecting and/or diffracting light beams 70, such as a prism, mirror, diffraction grating, or lens. In some examples, the beam-forming lens 110 both focuses and tilts the light beam. FIG. 3A and FIG. 3B particularly illustrate a prism 37 as an embodiment of a light directing element. In particular, the prism 37 can tilt light beams 70. For example, FIG. 3B shows a portion or component of the light beam 70 propagating towards the bi-directional multiplexer/de-multiplexer 71 (e.g., the received component) passes through the prism and is tilted to facilitate the zigzag propagation path of the light zig-zag multiplexer/de-multiplexer.

Figure 4A:
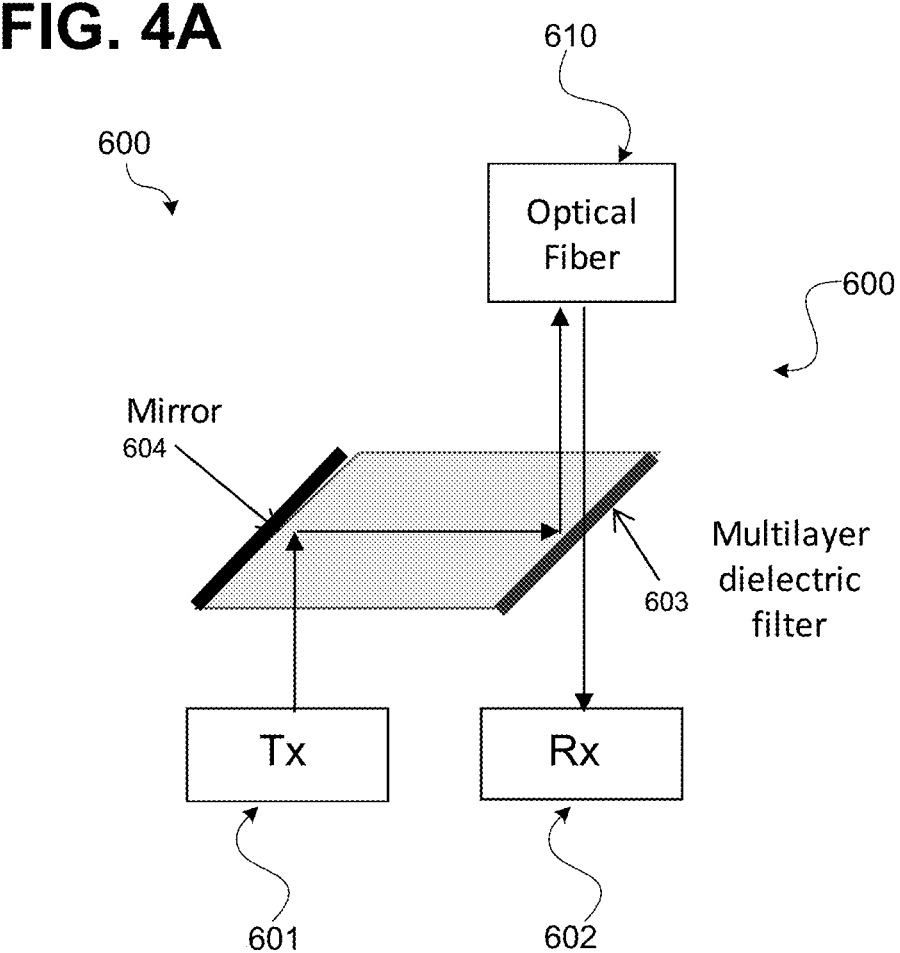
FIG. 4A is a diagram illustrating an example of waveband splitter aspects employed by the multilayer dielectric filter implementation of the surface of the bi-directional multiplexer/de-multiplexer in FIG. 3A according to some embodiments.

Referring to FIG. 4A, the diagram 600 shows the multilayer dielectric filter 603 as an interface between the optical fiber 610 and the light transmitting elements array 601 (shown as Tx in FIG. 4A), and light receiving elements array 602 (shown as Rx in FIG. 4A). The diagram 600 serves to illustrate that optical signals emitted at the transmit wavelengths are directed towards the filter by mirror 604, but are deflected by the filter 603 (as the up arrow indicating the internal light runs towards the optical fiber 610). Optical signals at the receive wavelengths are passed from the optical fiber 610 through the filter 603, and allowed to propagate towards the light receiving elements array 602.

Figure 4B:
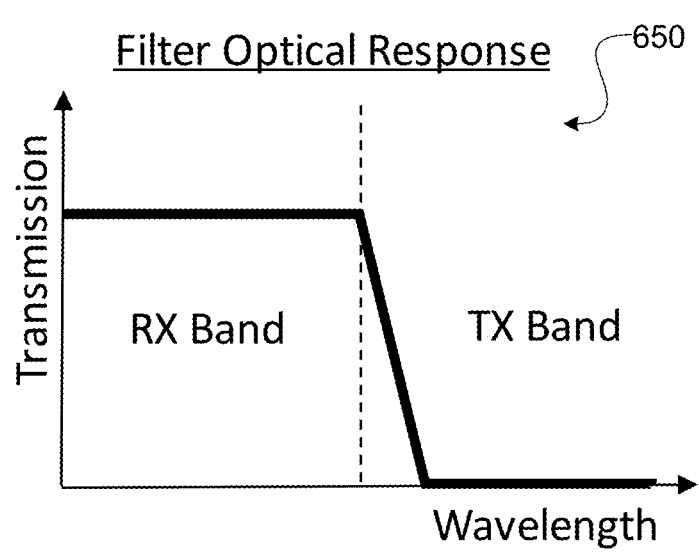
FIG. 4B is an example of a graphical representation of filter optical response related to the waveband splitter aspects employed by the multilayer dielectric filter implementation of the surface of the bi-directional multiplexer/de-multiplexer in FIG. 3B according to some embodiments.

In now referring to FIG. 4B, an example of a graphical representation 650 of waveband filter optical response is shown. The graph 650 represents the waveband filter's response by plotting filter transmission (y-axis) as a function of wavelength (x-axis). The graph 650 indicates that wavelengths within the band of receive (Rx) wavelengths are transmitted, or otherwise passed, by the waveband filter. The graph 650 includes a line of demarcation, which is indicative of the transition to transmit (Tx) wavelengths that are not passed, or are reflected, by the filter.

Figure 5:
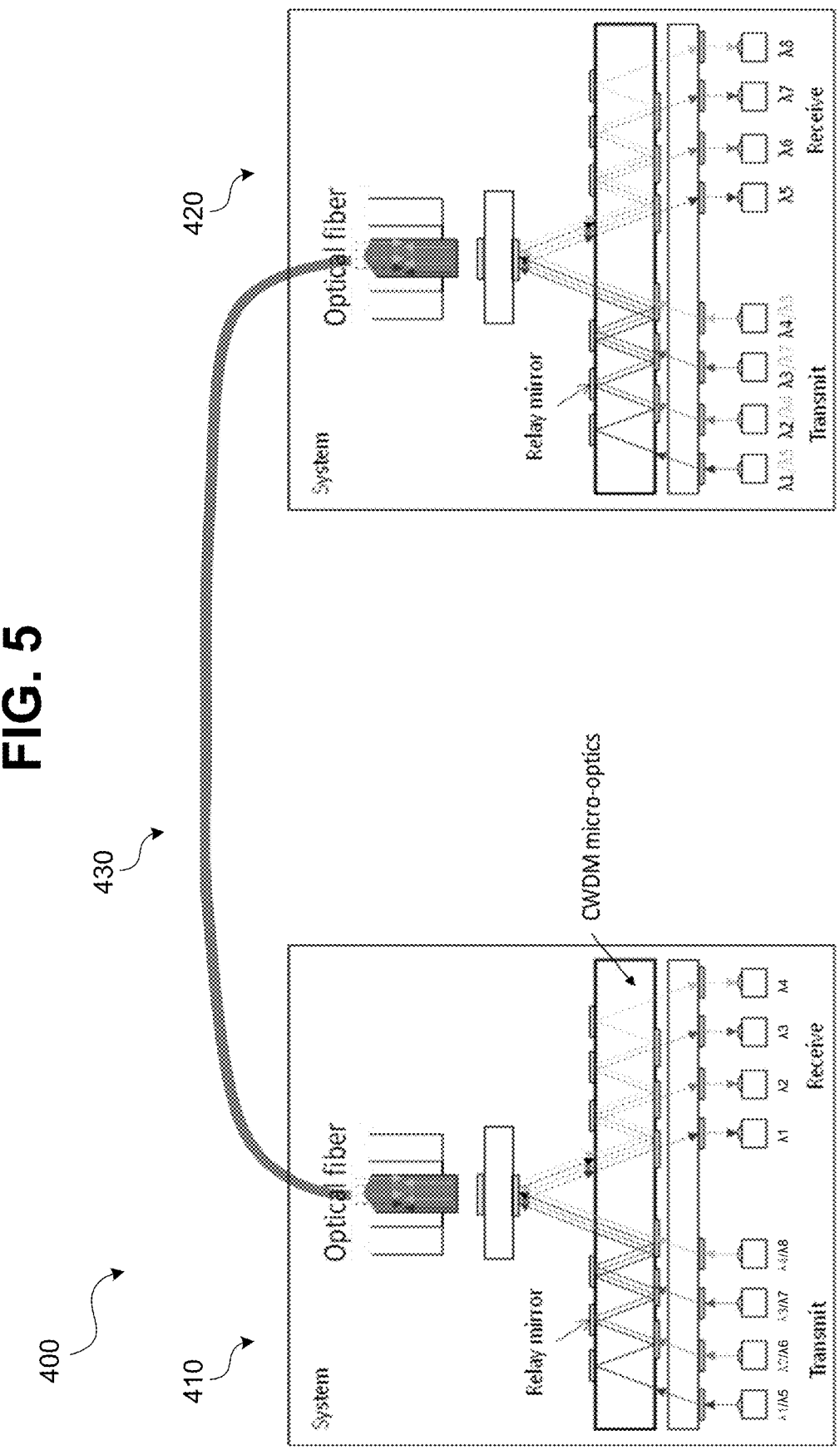
FIG. 5 is a diagram illustrating optical multiplexing systems communicating using bi-directional multiplexing in accordance with a mode-based implementation of some of the embodiments.

FIG. 5 is a diagram illustrating optical multiplexing systems 410 and 420 communicating using bi-directional multiplexing in accordance with a mode-based implementation of some of the embodiments. In the illustrated example, both systems 410 and 420 are dual-side, bi-directional optical multiplexing system having capabilities in accordance with the disclosed embodiments. In the example, the systems 410, 420 can be communicatively connected through at least one optical cable 430 using optical interconnection technologies. As shown, system 420 is configured to utilize transmit wavelength sets $\lambda_1$-$\lambda_4$ and system 410 is configured to utilize transmit wavelength sets $\lambda_5$-$\lambda_8$. Consequently, system 420 detects receive wavelengths $\lambda_5$-$\lambda_8$ and system 410 detects receive wavelengths $\lambda_1$-$\lambda_4$. The systems 410, 420 can transmit optical signals using the different wavelength sets by employing the mode selection features of the embodiments. As such, $\lambda_1$, $\lambda_2$, $\lambda_3$, $\lambda_4$ and $\lambda_5$, $\lambda_6$, $\lambda_7$, $\lambda_8$ have the same respective wavelengths but different mode. In the case where system 410 operates in uplink (e.g., sending information through the network) system 410 can select a first mode (e.g., mode1) which indicates that transmit components are configured to transmit optical signals at wavelengths $\lambda_1$-$\lambda_4$. At the receiving system, namely system 420, the wavelengths $\lambda_1$-$\lambda_4$ will be received as receive signal at wavelengths $\lambda_1$-$\lambda_4$. It should be appreciated that system 420 can also transmit optical signals across fiber cable 430 to system 410 while it is receiving the signals from the sender system 410 in accordance with the bi-directional aspects of the embodiments. In another example, selecting a second mode (e.g., mode2) can indicate that transmit components of system 420 are configured to transmit optical signals at wavelengths $\lambda_5$-$\lambda_8$, which are identical to the transmits signal wavelengths. In this case, system 410 will receive optical signals transmitted from system 420 at corresponding receive signal wavelengths $\lambda_5$-$\lambda_8$. It should be appreciated that although wavelength sets are discussed as including four wavelengths for purposes of illustration, but the systems can be scaled to utilize more wavelengths to communicate optical signals through optical networks as deemed necessary and/or appropriate. As described before with respect to the WDM-based approach, wavelength sets $\lambda_1$-$\lambda_4$ vs $\lambda_5$-$\lambda_8$ may be different wavelengths.

Figure 6:
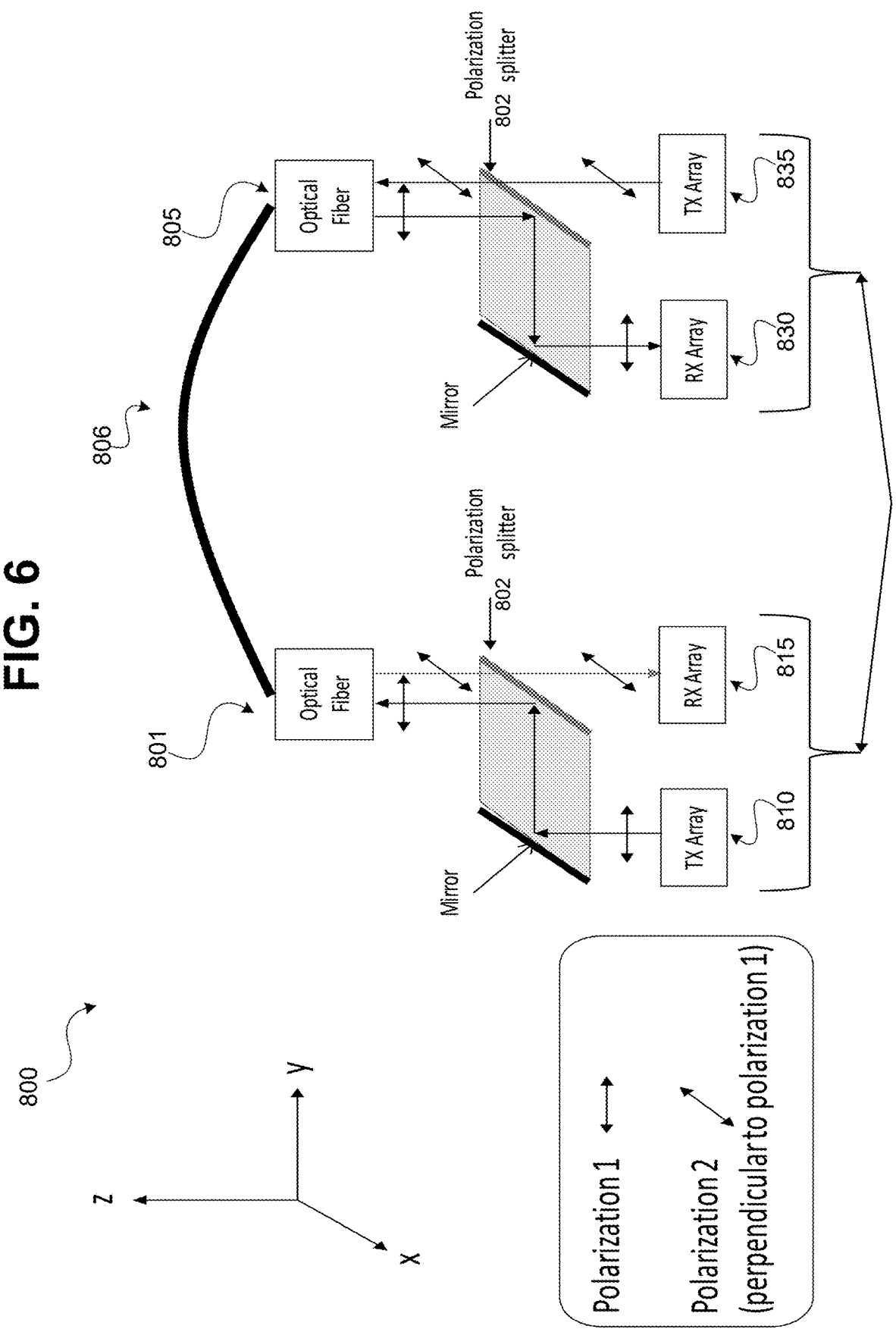
FIG. 6 is a diagram illustrating bi-directional multiplexing aspects in accordance with a polarization-based implementation of some of the embodiments.

In FIG. 6, an example polarization-based implementation is illustrated, where different polarization modes, instead of different spatial modes, can be utilized to support transmitting signals at identical wavelengths. The illustrated example 800 shows applying a polarization 1, and a polarization 2 which is shown as perpendicular, or orthogonal, to polarization 1. Accordingly, in an example, optical signals from the transmit array 810 can be polarized, for example by polarization of the light. FIG. 5 shows light from the transmit array 810 being polarized in the y-direction, while optical signals being received by the receive array 815 can be communicated by polarizing those signals in the x-direction. The polarization splitter 802 functions to separate the polarized signals for transmission across the cable between the optical fibers 801,805. Thus, even in the case where the transmit signals and receive signals have the same wavelength, the polarization aspects of the embodiment can achieve bi-directional communication. Additionally, the example in FIG. 6 shows that polarization splitting can be implemented at the destination end of the cable 806. Signals of the transmit array 830 and receive array 835 associated with optical fiber 805 can be polarized in a manner similar to that described in relation to optical fiber 801. Accordingly, the described polarization techniques allow identical wavelength sets to coexist within the same fiber.

Figure 7:
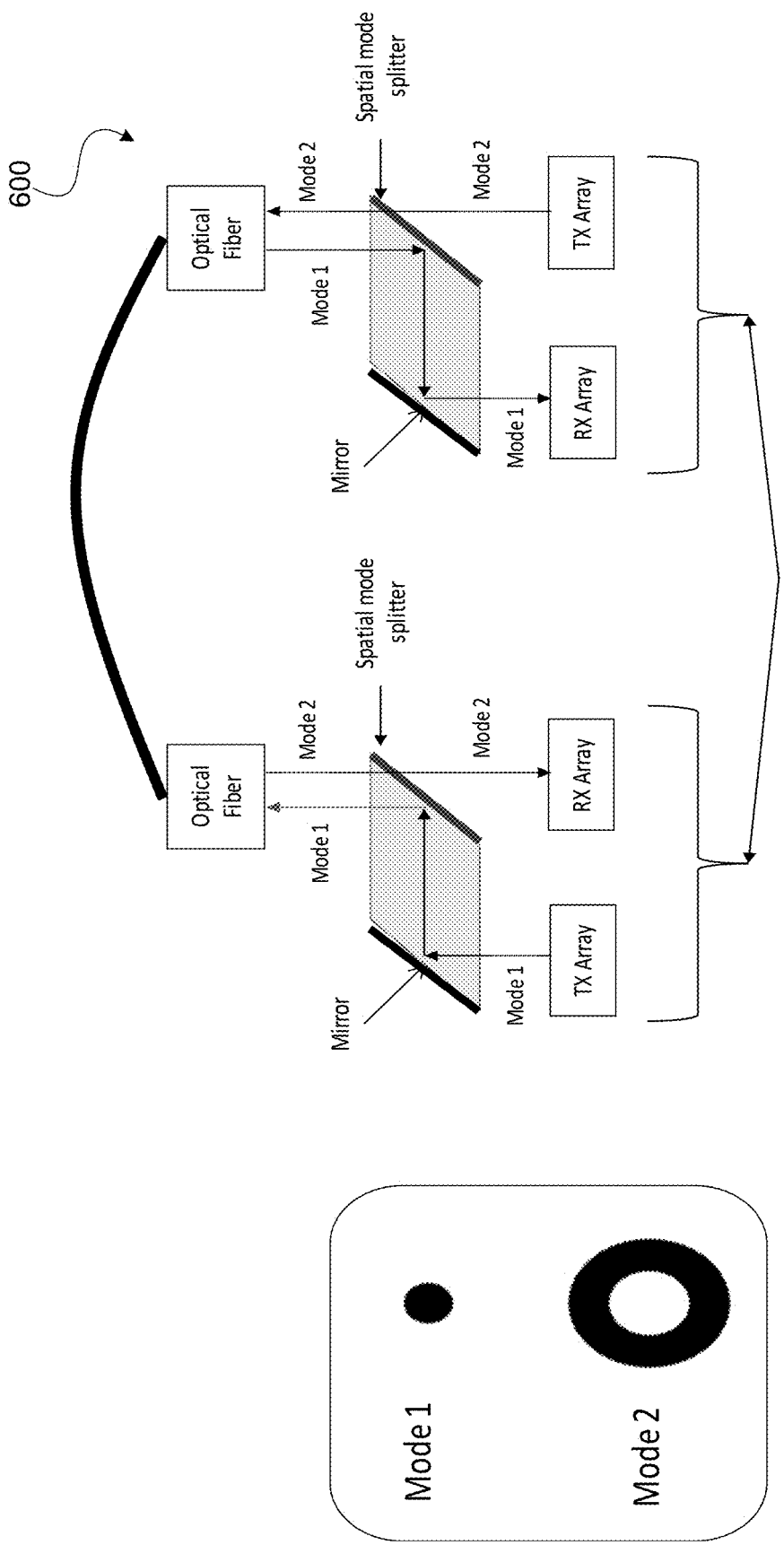
FIG. 7 is a diagram illustrating bi-directional multiplexing aspects in accordance with the mode-based implementation of some of the embodiments.

FIG. 7 is a diagram conceptually illustrating a spatial mode splitting, which achieves a similar functionality to polarization in allowing shared wavelength sets to be transmitted in accordance with the bi-directional capabilities disclosed herein. In FIG. 7, spatial mode1 may correspond to the fundamental mode in the fiber, while spatial mode2 may correspond to a higher order mode in the fiber that has little or no spatial overlap with spatial mode1. The spatial mode filter may be constructed with a circular mirror surface to reflect spatial mode1 while transmitting spatial mode2.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A dual-side bi-directional optical multiplexing system, comprising:
   a light receiving array to receive light in an egress propagation direction from an optical fiber, and arranged on a first side of and displaced from a central axis of the optical fiber, wherein receiving light comprises receiving light at a plurality of receive wavelengths;
   a light transmitting array to emit light in an ingress propagation direction into the optical fiber, and arranged on an opposing side of the central axis of the optical fiber from the light receiving array and displaced from the central axis of the optical fiber, wherein emitting light comprises emitting light at a plurality of transmit wavelengths and wherein the first position of the light receiving array and a second position of the light transmitting array are arranged so as to form dual-sides of the system with respect to the central axis of the optical fiber such that the light receiving array and light transmitting array are equidistant from the central axis of the optical fiber; and
   bi-directional micro-optics to interface with the optical fiber to direct light propagating in the egress propagation direction from the optical fiber towards the first position of the light receiving elements array with respect to the dual-sides of the system, the bi-directional micro-optics further interfacing with the light transmitting array to direct light propagating in the ingress direction emitted from the second position of the light transmitting array towards the optical fiber, and wherein the plurality of receive wavelengths propagate in the egress propagation direction through the optical fiber and wherein the plurality of transmit wavelengths are combined for propagation in the ingress direction through the optical fiber, wherein the bi-directional micro-optics comprise:
a zigzag multiplexer/demultiplexer aligned with the optical fiber at the central axis of the optical fiber; and a
a bi-directional multiplexer/de-multiplexer aligned with the optical fiber at the central axis of the optical fiber, wherein the bi-directional multiplexer/demultiplexer selectively deflects the light propagating in the egress propagation direction from the optical fiber towards a zigzag propagation path on the zigzag multiplexer/demultiplexer based on the plurality of receive wavelengths, and selectively deflects light propagating from the zigzag propagation path on the zigzag multiplexer/demultiplexer in the ingress direction towards the optical fiber based on the plurality of transmit wavelengths.

2. The dual-side bi-directional optical multiplexing system of claim 1, wherein the optical fiber is oriented with respect to the bi-directional micro-optics to simultaneously receive the emitted light at a plurality of transmit wavelengths and the provide the received light at the plurality of receive wavelengths.

3. The dual-side bi-directional optical multiplexing system of claim 2, wherein the bi-directional micro-optics comprise:
a light directing element;
a lens to collimate the light propagating in the egress propagation direction from the optical fiber towards the light directing element; and
a plurality of relay mirrors to reflect the light deflected from the light directing element to follow the zigzag propagation path.

4. The dual-side bi-directional optical multiplexing system of claim 3, wherein the bi-directional micro-optics further comprise:
a plurality of optical filters to selectively pass a portion of the emitted light at a plurality of transmit wavelengths to continue propagation in the ingress direction towards the optical fiber.

5. The dual-side bi-directional optical multiplexing system of claim 3, wherein the bi-directional micro-optics further comprise:
a plurality of optical filters to selectively pass a portion of the received light at a plurality of receive wavelengths to continue propagation in the egress direction towards the first position of the light receiving elements array.

6. The dual-side bi-directional optical multiplexing system of claim 3, wherein a surface of the bi-directional multiplexer/de-multiplexer comprises at least one of: a waveband splitter, a polarization splitter, or a spatial mode splitter.

7. The dual-side bi-directional optical multiplexing system of claim 1, wherein the light transmitting elements array comprises a plurality of optical sources arranged to form a two-dimensional (2D) structure, and the light receiving elements array comprises a plurality of photodetectors arranged to form a two-dimensional (2D) structure.

8. The dual-side bi-directional optical multiplexing system of claim 1, wherein a first plurality of transmit wavelengths comprise different wavelengths from the plurality of receive wavelengths, and a second plurality of transmit wavelengths comprise wavelengths identical to the plurality of receive wavelengths.

9. The dual-side bi-directional optical multiplexing system of claim 8, wherein a first mode of operation involves the light transmitting elements array emitting light at the first plurality of transmit wavelength, and the light receiving elements array receiving light at the plurality of receive wavelengths.

10. The dual-side bi-directional optical multiplexing system of claim 8, wherein a second mode of operation involves the light transmitting elements array emitting light at the second plurality of transmit wavelengths.

11. The dual-side bi-directional optical multiplexing system of claim 10, wherein a third mode of operation involves transmitting the second plurality of transmit wavelengths comprising wavelengths identical to the plurality of receive wavelengths using orthogonal polarizations.

12. A dual-side bi-directional optical multiplexer, comprising:
a zigzag multiplexer/demultiplexer;
a plurality of photodetectors receiving light in an egress propagation direction from an optical fiber, and arranged on a first side of and displaced from a central axis of the zigzag multiplexer/demultiplexer, wherein receiving light comprises receiving light at a plurality of receive wavelengths;
a plurality of light sources emitting light in an ingress propagation direction into the optical fiber, and arranged on an opposing side of the central axis of the zigzag multiplexer/demultiplexer from the plurality of photodetectors and displaced from the central axis of the zigzag multiplexer/demultiplexer, wherein emitting light comprises emitting light at a plurality of transmit wavelengths and wherein a first position of the plurality of photodetectors and a second position of the plurality of light sources are arranged so as to form dual-sides of the system with respect to the central axis of the zigzag multiplexer/demultiplexer;
a light directing element coupled to the zigzag multiplexer/demultiplexer and aligned with the zigzag multiplexer/demultiplexer at a central axis of the zigzag multiplexer/demultiplexer, wherein the light directing element directs the light propagating in the egress propagation direction from the optical fiber towards the zigzag multiplexer/demultiplexer based on the plurality of receive wavelengths, and directs light propagating from the zigzag multiplexer/demultiplexer in the ingress direction towards the optical fiber based on the plurality of transmit wavelengths;
a plurality of first lenses to focus light received at a plurality of transmit wavelengths from a plurality of optical sources to travel in a zigzag propagation path on the zigzag multiplexer/demultiplexer towards the optical fiber;
a plurality of second lenses to focus light propagating the zigzag multiplexer/demultiplexer in an egress propagation direction from the optical fiber at a plurality of receive wavelengths towards the plurality of photodetectors;
a bi-directional multiplexer/de-multiplexer aligned with the light directing element and the zigzag multiplexer/demultiplexer at a central axis of the zigzag multiplexer/demultiplexer, wherein the bi-directional multiplexer/demultiplexer selectively passes portions of the light having the plurality of receive wavelengths and propagating in the egress propagation direction to follow the zigzag propagation path on the zigzag multiplexer/demultiplexer towards the plurality of photodetectors, and selectively reflects portions of the light having the plurality of transmit wavelengths from the zigzag multiplexer/demultiplexer and towards the optical fiber, and wherein the plurality of transmit wavelengths are combined for propagation in the ingress propagation direction through the optical fiber;

a first plurality of optical filters to selectively pass portions of the light having the plurality of transmit wavelengths towards the zigzag propagation path on the zigzag multiplexer/demultiplexer and towards the optical fiber based on the plurality of transmit wavelengths;

a second plurality of optical filters to selectively pass portions of light having the plurality of receive wavelengths towards the zigzag propagation path on the zigzag multiplexer/demultiplexer and towards the photodetectors based on the plurality of receive wavelengths; and a plurality of relay mirrors to reflect the light having the plurality of transmit wavelengths and the light having the plurality of receive wavelengths and directing the light to follow the zigzag propagation path on the zigzag multiplex/demultiplexer between the plurality of optical filters and the plurality of relay mirrors.

13. The dual-side bi-directional optical multiplexer of claim 12, wherein the bi-directional multiplexer/de-multiplexer comprises at least one of: a waveband splitter, a polarization splitter, or a spatial mode splitter.

14. A method of bi-directional optical signal multiplexing/de-multiplexing, comprising:

receiving light propagating in an egress direction from an optical fiber at a plurality of receive wavelengths;

transmitting light emitted from one of an array of optical sources having a transmit wavelength from a plurality of transmit wavelengths and propagating in an ingress direction towards an optical fiber;

selectively deflecting, by a diffractive optical element of a dual-side bi-directional optical multiplexer, the light propagating in an egress propagation direction from the optical fiber towards a zigzag propagation path based on each of the plurality of receive wavelengths;

selectively deflecting, by the diffractive optical element of the dual-side bi-directional optical multiplexer, light propagating in the ingress direction towards the optical fiber based on each of the plurality of transmit wavelengths, and wherein the plurality of receive wavelengths are combined for propagation in the egress propagation direction through the optical fiber and wherein the plurality of transmit wavelengths are combined for propagation in the ingress direction through the optical fiber;

selectively filtering light propagating along the zigzag propagation path at the plurality of receive wavelengths to propagate in a direction towards a light receiving elements array arranged on a first side of a zigzag multiplexer/de-multiplexer based on each of the plurality of receive wavelengths; and selectively filtering light emitted light from one of an array of optical sources arranged on an opposing side of the zigzag multiplexer/de-multiplexer at the plurality of transmit wavelengths, to propagate in a direction towards the zigzag propagation path based on each of the plurality of transmit wavelengths, wherein the light receiving elements array and the array of optical sources are arranged so as to form dual-sides of the system with respect to a central axis of the optical fiber, and wherein the light receiving elements array and the array of optical sources are equidistant from the central axis of the optical fiber.

* * * * *